(12) United States Patent
Claeson et al.

(10) Patent No.: US 12,238,585 B2
(45) Date of Patent: *Feb. 25, 2025

(54) CLIENT DEVICE AND NETWORK NODE FOR INDICATION OF QUALITY-OF-SERVICE (QOS) NON-FULFILLMENT

(71) Applicant: HUAWEI TECHNOLOGIES CO., LTD., Shenzhen (CN)

(72) Inventors: Gustaf Claeson, Lund (SE); Vishnu Preman, Lund (SE); Rama Kumar Mopidevi, Lund (SE); Bengt Lindoff, Kista (SE); Taimoor Abbas, Kista (SE)

(73) Assignee: Huawei Technologies Co., Ltd, Shenzhen (CN)

( * ) Notice: Subject to any disclaimer, the term of this patent is extended or adjusted under 35 U.S.C. 154(b) by 481 days.

This patent is subject to a terminal disclaimer.

(21) Appl. No.: 17/534,163

(22) Filed: Nov. 23, 2021

(65) Prior Publication Data

US 2022/0086699 A1 Mar. 17, 2022

Related U.S. Application Data

(63) Continuation of application No. PCT/EP2019/063388, filed on May 23, 2019.

(51) Int. Cl.
*H04W 28/24* (2009.01)
*H04W 24/08* (2009.01)
(Continued)

(52) U.S. Cl.
CPC ........... *H04W 28/24* (2013.01); *H04W 24/08* (2013.01); *H04W 28/0273* (2013.01); *H04W 28/12* (2013.01)

(58) Field of Classification Search
CPC .................................................... H04W 28/24
See application file for complete search history.

(56) References Cited

U.S. PATENT DOCUMENTS

| | | | |
|---|---|---|---|
| 11,153,833 | B2 | 10/2021 | Balachandran et al. |
| 2005/0094560 | A1 | 5/2005 | Montes Linares |

(Continued)

FOREIGN PATENT DOCUMENTS

| | | |
|---|---|---|
| CN | 102396259 A | 3/2012 |
| JP | 6808035 B2 | 1/2021 |

(Continued)

OTHER PUBLICATIONS

"3rd Generation Partnership Project; Technical Specification Group Radio Access Network; Study on Scenarios and Requirements for Next Generation Access Technologies (Release 15)," 3GPP TR 38.913 V15.0.0, total 39 pages, 3rd Generation Partnership Project, Valbonne, France (Jun. 2018).

(Continued)

*Primary Examiner* — Abdeltif Ajid
(74) *Attorney, Agent, or Firm* — Leydig, Voit & Mayer, Ltd.

(57) ABSTRACT

The disclosure relates to early detection and indication of a Quality-of-Service (QoS) non-fulfillment in one or more radio links serving an application. A client device monitors for a QoS non-fulfillment in the one or more radio links based on a QoS monitoring configuration associated with the application. The QoS monitoring configuration may be received from a network node and/or derived based on a predefined rule. Upon detection of a QoS non-fulfillment of one or more QoS requirements obtained from the QoS monitoring configuration, the client device provides a QoS non-fulfillment indication to the application. The QoS non-fulfillment indication gives the application an early warning about QoS non-fulfillment on the one or more radio links.

(Continued)

Thereby, allowing the application to take precautionary actions to counteract possible negative consequences of the QoS non-fulfillment. Furthermore, the disclosure also relates to corresponding methods and a computer program.

24 Claims, 6 Drawing Sheets

(51) Int. Cl.
*H04W 28/02* (2009.01)
*H04W 28/12* (2009.01)

(56) References Cited

U.S. PATENT DOCUMENTS

| | | | |
|---|---|---|---|
| 2017/0013514 A1* | 1/2017 | Tseng | H04W 36/0016 |
| 2017/0230956 A1 | 8/2017 | Kim et al. | |
| 2017/0325120 A1 | 11/2017 | Szilagyi et al. | |
| 2018/0176830 A1 | 6/2018 | Yang et al. | |
| 2019/0052377 A1 | 2/2019 | Hwang et al. | |
| 2019/0053293 A1 | 2/2019 | Akoum et al. | |
| 2022/0022192 A1 | 1/2022 | Sakhnini et al. | |
| 2022/0132603 A1 | 4/2022 | Adjakple et al. | |
| 2022/0150782 A1* | 5/2022 | Liu | H04W 28/0263 |

FOREIGN PATENT DOCUMENTS

| | | | |
|---|---|---|---|
| WO | 2017135998 A1 | 8/2017 | |
| WO | WO-2019032503 A1 * | 2/2019 | H04W 24/04 |
| WO | 2019065617 A1 | 4/2019 | |

OTHER PUBLICATIONS

"3rd Generation Partnership Project; Technical Specification Group Radio Access Network; NR; Requirements for support of radio resource management (Release 15)," 3GPP TS 38.133 V15.5.0, total 893 pages, 3rd Generation Partnership Project, Valbonne, France (Mar. 2019).
3GPP TS 24.501 V16.0.2, "Non-Access-Stratum (NAS) protocol for 5G System (5GS); Stage 3," Release 16, total 480 pages, 3rd Generation Partnership Project, Valbonne, France, 3rd Generation Partnership Project, Valbonne, France (Mar. 2019).
"3rd Generation Partnership Project; Technical Specification Group Radio Access Network; NR; Packet Data Convergence Protocol (PDCP) specification (Release 15)," 3GPP TS 38.323 V15.5.0, total 26 pages (Mar. 2019).
"3rd Generation Partnership Project; Technical Specification Group Radio Access Network; NR; Radio Link Control (RLC) protocol specification (Release 15)," 3GPP TS 38.322 V16.0.0, total 33 pages, 3rd Generation Partnership Project, Valbonne, France (Dec. 2018).
"3rd Generation Partnership Project; Technical Specification Group Services and System Aspects; System Architecture for the 5G System (Release 16)," 3GPP TS 23.501 V16.0.2, total 317 pages, 3rd Generation Partnership Project, Valbonne, France (Apr. 2019).
3rd Generation Partnership Project; Technical Specification Group Services and System Aspects; Procedures for the 5G System; Stage 2 (Release 16), 3GPP TS 23.502 V16.0.2, total 419 pages, 3rd Generation Partnership Project, Valbonne, France (Apr. 2019).
"3rd Generation Partnership Project; Technical Specification Group Radio Access Network; NR; Radio Resource Control (RRC) protocol specification (Release 15)," 3GPP TS 38.331 V15.5.1, total 491 pages, 3rd Generation Partnership Project, Valbonne, France (Apr. 2019).
"3rd Generation Partnership Project; Technical Specification Group Radio Access Network; E-UTRA and NR; Service Data Adaptation Protocol (SDAP) specification (Release 15)," 3GPP TS 37.324 V15.1.0, total 13 pages, 3rd Generation Partnership Project, Valbonne, France (Sep. 2018).
Huawei et al., "Add indication of Notification Control to QoS rules sent to UE," 3GPP TSG-SA WG2 Meeting #127bis, S2-186157, Newport Beach, USA, XP051459137, Total 2 pshrd, 3rd Generation Partnership Project, Valbonne, France (May 28-Jun. 1, 2018).
Huawei et al., "KI#3: Evaluation of Solution 16," SA WG2 Meeting #129bis, S2-1812381(was of S2-1810636), West Palm Beach, FL, USA, XP051563894, Total 6 pages, 3rd Generation Partnership Project, Valbonne, France (Nov. 26-30, 2018).
"3rd Generation Partnership Project; Technical Specification Group Radio Access Network; NR; Physical channels and modulation (Release 15)," 3GPP TS 38.211 V15.5.0, Total 96 pages, 3rd Generation Partnership Project, Valbonne, France (Mar. 2019).
"3rd Generation Partnership Project; Technical Specification Group Radio Access Network; NR; Physical layer procedures for control (Release 15)," 3GPP TS 38.213 V15.5.0, Total 104 pages, 3rd Generation Partnership Project, Valbonne, France (Mar. 2019).
"3rd Generation Partnership Project; Technical Specification Group Radio Access Network; NR; Physical layer procedures for data (Release 15)," 3GPP TS 38.214 V15.5.0, Total 103 pages, 3rd Generation Partnership Project, Valbonne, France (Mar. 2019).

* cited by examiner

CLIENT DEVICE AND NETWORK NODE FOR INDICATION OF QUALITY-OF-SERVICE (QOS) NON-FULFILLMENT

CROSS-REFERENCE TO RELATED APPLICATIONS

This application is a continuation of International Application No. PCT/EP2019/063388, filed on May 23, 2019, the disclosure of which is hereby incorporated by reference in its entirety.

FIELD

The disclosure relates to a client device and a network node for early detection and indication of a Quality-of-Service (QoS) non-fulfillment. Furthermore, the disclosure also relates to corresponding methods and a computer program.

BACKGROUND

A critical requirement of 3GPP 5G new radio (NR) is the support for ultra reliable low latency communication (URLLC) services, where latency expresses the time required for transmitting a message through the network. The requirement in Rel-15 for URLLC has been set to a latency of 1 ms, one way over the radio access network, combined with a packet error rate (PER) of 10e-5. For Rel-16 it is expected that the requirements will be set even tougher.

An application will request certain QoS of the 5G network and may have multiple data streams, each with an individual QoS setting. If the requested levels of QoS are accepted by the 5G network, the 5G network will try to fulfil its QoS obligations towards the application over time. In wireless networks, there are several factors affecting the QoS that can be achieved in reality such as, e.g., unpredictable movement of the client device or movement from other objects causing blocking of radio signals. Hence, there will be situations where the negotiated QoS will not be met.

For future application types targeted by NR, this fact may be critical. Examples of areas for such URLLC traffic can be within the road traffic control and management, production industry or health care, with applications such as remote driving, platooning, factory automation or remote surgery. These are typical examples of applications that do not only require demanded QoS but also represent cases where an instantaneous failure or rapid degradation of the actually delivered QoS from the radio access network can have dire consequences. This fact has been lifted by organisations, such as 5GAA and 5G-ACIA, setting the input requirements for 5G focusing on vehicle and industrial use cases, respectively, where prediction of delivered QoS is seen as an important area.

Packet duplication, which is one way to increase the reliability, was introduced in Rel-15 to facilitate URLLC services. In Rel-15, packet duplication is configured with either carrier aggregation (CA) or dual connectivity (DC). In future releases, packet duplication with DC and CA will also be supported. For the duplication case the network ensures using different component carriers for the respective transmission of different radio link control entities with logical channel mapping restrictions.

SUMMARY

Embodiments of the disclosure provide a solution which mitigates or solves the drawbacks and problems of conventional solutions.

According to a first aspect of the disclosure, embodiments provide a client device for a wireless communication system, the client device being configured to:
  obtain a Quality-of-Service (QoS) monitoring configuration associated with an application;
  monitor for a QoS non-fulfillment in one or more radio links serving the application based on the QoS monitoring configuration; and
  provide a QoS non-fulfillment indication to the application upon detection of a QoS non-fulfillment of one or more QoS requirements obtained from the QoS monitoring configuration.

An application herein can be understood to be any service that can be supported in the wireless communication network and which can use communication resources in the core network and the radio access network. Examples of applications are factory automation, augmented reality, virtual reality, and vehicle-to-anything. Unless otherwise stated, the application herein corresponds to an application in the client device. The application in the client device can typically be arranged to communicate with a corresponding application in a data network or a core network. The application can have one or more QoS flows and the QoS monitoring configuration can be applicable to one or more of the QoS flows.

The QoS monitoring configuration can in this disclosure comprise, e.g., number of independent radio links, a set of rules, a timer or a time window.

That the one or more QoS requirements are obtained from the QoS monitoring configuration can mean that the one or more QoS requirements can be determined/derived either explicitly or implicitly from information comprised in the QoS monitoring configuration. The one or more QoS requirements can, e.g., be directly comprised in the QoS monitoring configuration or indicated in the QoS monitoring configuration such that the one or more QoS requirements can be derived from the QoS monitoring configuration using additional information such as, e.g., a predefined rule.

An advantage of the client device according to the first aspect is that it enables a low latency solution to offer an early QoS warning to improve robustness as a complementary safety mechanism for future 5G applications. Applications where failure to meet QoS requirements can have dire consequences to the client device hosting the 5G modem or other client devices in its proximity. The early QoS warning allows the application to take precautionary actions such as, e.g., enter into a safe-mode. The client device according to the first aspect further enables the solution to be triggered autonomously in the client device with only a semi-static configuration from the network. Hence, avoiding a real-time dependency towards the network at the moment of detection of QoS degradation. Furthermore, with the QoS monitoring configuration the monitoring and detection of QoS non-fulfillment can be tuned towards different services such that optimized per service reliability can be achieved.

In an implementation of a client device according to the first aspect, the client device is further configured to:
  monitor for a QoS fulfillment in the one or more radio links based on the QoS monitoring configuration; and
  provide a QoS fulfillment indication to the application upon detection of a QoS fulfillment of the one or more QoS requirements.

An advantage with this implementation is that the application can be informed when the QoS requirement is fulfilled again. The application can then resume its normal service and stop any precautionary action.

In an implementation of a client device according to the first aspect, the QoS monitoring configuration indicates at least one of: a QoS monitoring rule, information of downlink radio links serving the application, a downlink timer associated with the downlink radio links, information of uplink radio links serving the application, an uplink timer associated with the uplink radio links, and a QoS threshold value.

The downlink timer can be denoted downlink time window and the uplink timer can be denoted uplink time window.

An advantage with this implementation is that the information in the QoS monitoring configuration enables the monitoring and detection of QoS non-fulfillment to be tuned towards different services such that optimized per service reliability can be achieved.

In an implementation of a client device according to the first aspect, detection of a QoS non-fulfillment comprises at least one of:
  detect a QoS non-fulfillment in the downlink if at least one downlink radio link serving the application is indicated as not fulfilling a QoS requirement; and
  detect a QoS non-fulfillment in the uplink if at least one uplink radio link serving the application is indicated as not fulfilling a QoS requirement.

An advantage with this implementation is that the QoS non-fulfillment indication can be triggered separately for downlink and uplink radio links. Thereby, providing a flexible and robust solution.

In an implementation of a client device according to the first aspect, detection of a QoS non-fulfillment further comprises:
  detect a QoS non-fulfillment in the downlink if at least one downlink radio link serving the application is indicated as not fulfilling a QoS requirement during a time period defined by the downlink timer; and
  detect a QoS non-fulfillment in the uplink if at least one uplink radio link serving the application is indicated as not fulfilling a QoS requirement during a time period defined by the uplink timer.

An advantage with this implementation is that by using a specific timer QoS non-fulfillment indications for temporary dips in the QoS can be avoided. Thereby, e.g., avoiding unnecessary processing in the client device. That the time period is defined by the downlink timer and/or uplink timer allows the time period to be tuned to different services, thereby optimizing per service reliability.

In an implementation of a client device according to the first aspect, the radio links serving the application are independent radio links configured for packet duplication in the downlink and the uplink, respectively, and detection of a QoS non-fulfillment comprises at least one of:
  detect a QoS non-fulfillment in the downlink if all independent downlink radio links serving the application are indicated as not fulfilling a QoS requirement; and
  detect a QoS non-fulfillment in the uplink if all independent uplink radio links serving the application are indicated as not fulfilling a QoS requirement.

An advantage with this implementation is that QoS non-fulfillments can be detected and combined for applications using packet duplication.

In an implementation of a client device according to the first aspect, detection of a QoS non-fulfillment comprises at least one of:
  detect a QoS non-fulfillment in the downlink if all independent downlink radio links serving the application are indicated as not fulfilling a QoS requirement during a time period defined by the downlink timer; and
  detect a QoS non-fulfillment in the uplink if all uplink radio links serving the application are indicated as not fulfilling a QoS requirement during a time period defined by the uplink timer.

An advantage with this implementation is that by using a specific timer QoS non-fulfillment indications for temporary dips in the QoS can be avoided. Thereby, e.g., avoiding unnecessary processing in the client device. That the time period is defined by the downlink timer and/or uplink timer allows the time period to be tuned to different services, thereby optimizing per service reliability.

In an implementation of a client device according to the first aspect, the QoS requirement is any of error rate or latency.

An advantage with this implementation is that it enables detection of different QoS characteristic and further enables QoS non-fulfillment indications to be provided for specific QoS characteristic. Thereby, providing a flexible and robust solution.

In an implementation of a client device according to the first aspect, the client device is further configured to:
  obtain the QoS monitoring configuration in a first layer;
  monitor for a QoS non-fulfillment in the one or more radio links in a third layer and provide QoS indications from the third layer to a second layer; and
  detect a QoS non-fulfillment of the one or more QoS requirements in the second layer based on QoS indications provided by the third layer.

An advantage with this implementation is that the solution is based on the conventional layer structure in the client device. Thereby, making the solution less complex and easy to implement.

In an implementation of a client device according to the first aspect,
  the first layer is radio resource control or non access stratum,
  the second layer is packet data convergence protocol or medium access control, and
  the third layer is medium access control or physical layer.

An advantage with this implementation is that the solution is based on the conventional protocol stack in the client device. Thereby, making the solution less complex and easy to implement.

In an implementation of a client device according to the first aspect, obtain the QoS monitoring configuration comprises:
  receive at least one part of the QoS monitoring configuration from a network node.

An advantage with this implementation is that the network node can control and tune the QoS monitoring configuration towards different services, thereby optimizing per service reliability. Furthermore, allowing the QoS monitoring configuration to be tuned based on network node capabilities and availability, e.g., total available bandwidth in a network access node serving the client device, such that overall system performance can be optimized.

In an implementation of a client device according to the first aspect, the client device is further configured to:
  receive the QoS monitoring configuration from the network node in response to transmission of a QoS monitoring activation request to the network node.

An advantage with this implementation is that the client device can control the activation of the monitoring and detection of QoS non-fulfillment, allowing the activation to be based on, e.g., information in the application layer.

In an implementation of a client device according to the first aspect, the QoS monitoring activation request is transmitted in any of a REGISTRATION REQUEST message, a PDU SESSION ESTABLISHMENT REQUEST message, and a PDU SESSION MODIFICATION REQUEST message.

An advantage with this implementation is that existing signalling messages can be used which simplifies the implementation.

In an implementation of a client device according to the first aspect, obtain the QoS monitoring configuration comprises:
derive at least one part of the QoS monitoring configuration from a predefined rule.

An advantage with this implementation is that network signalling overhead can be reduced.

In an implementation of a client device according to the first aspect, obtain the QoS monitoring configuration comprises:
derive at least one part of the QoS monitoring configuration from a predefined rule and in dependence on one or more characteristics of QoS flows or IP packet flows associated with the application, wherein the one or more characteristics are at least one of 5G QoS identifier, QoS flow identifier, resource type, packet error rate, packet delay budget, survival time and jitter.

The survival time can be a time period that an application consuming a communication service may continue without an anticipated message.

An advantage with this implementation is that that network signalling overhead can be reduced and the QoS monitoring configuration can be tuned according to the required QoS of the application.

In an implementation of a client device according to the first aspect, the client device is further configured to:
provide the QoS non-fulfillment indication to the application via at least one of service data adaptation protocol layer, a radio link control layer, and an intermediate layer, wherein the intermediate layer is arranged above the service data adaptation protocol layer but below the application layer.

An advantage with this implementation is that the standard protocol stack can be used which simplifies the implementation.

In an implementation of a client device according to the first aspect, the client device is further configured to:
perform reverse access stratum mapping in the service data adaptation protocol layer so as to identify one or more QoS flows associated with the application upon detection of non-fulfillment of the one or more QoS requirements.

An advantage with this implementation is that existing functionality of the protocol stack can be used in a new way which simplifies the implementation.

In an implementation of a client device according to the first aspect, the client device is further configured to:
apply a packet filter in reverse in the intermediate layer so as to identify the application upon detection of non-fulfillment of the one or more QoS requirements.

An advantage with this implementation is that existing functionality of the protocol stack can be used in a new way which simplifies the implementation.

In an implementation of a client device according to the first aspect, the client device is further configured to:

provide a report to a network node, wherein the report indicates information about the QoS non-fulfillment.

An advantage with this implementation is that the QoS non-fulfillment detected in the client device can be shared (synchronized) externally with the network node. Thereby, allowing the network node, e.g., a corresponding application in a data network, to take precautionary actions to counteract possible negative consequences of the detected QoS non-fulfillment.

In an implementation of a client device according to the first aspect, the client device is further configured to:
provide the report to a network node in a service data adaptation protocol report or in an application layer report.

An advantage with this implementation is that the QoS non-fulfillment detected in the client device can be shared (synchronized) externally with a network node in the core network or radio access network, as well as with a corresponding application in the data network.

According to a second aspect of the disclosure, embodiments provide a network node for a wireless communication system, the network node being configured to:
obtain a QoS monitoring activation request associated with an application from a client device;
determine at least one part of a QoS monitoring configuration based on the QoS monitoring activation request;
transmit the QoS monitoring configuration to the client device.

An advantage of the network node according to the second aspect is that the network node can control and tune the QoS monitoring configuration towards different services, thereby optimizing reliability per service. Furthermore, the QoS monitoring configuration can be tuned based on information available in the network node such as capabilities of the network node and resource availability in the network node and other nodes such as, e.g., total available bandwidth in a network access node serving the client device. In this way, the network node can optimize overall system performance.

In an implementation of a network node according to the second aspect, determine the QoS monitoring configuration comprises:
determine the QoS monitoring configuration based on the QoS monitoring activation request and in dependence on one or more characteristics of QoS flows or IP packet flows associated with the application, wherein the one or more characteristics are at least one of 5G QoS identifier, QoS flow identifier, resource type, packet error rate, packet delay budget, survival time and jitter.

An advantage with this implementation is that the QoS monitoring configuration can be tuned according to the required QoS of the application.

In an implementation of a network node according to the second aspect, the QoS monitoring configuration indicates at least one of: a QoS monitoring rule, information of downlink radio links serving the application, a downlink timer associated with the downlink radio links, information of uplink radio links serving the application, an uplink timer associated with the uplink radio links, and a QoS threshold value.

An advantage with this implementation is that that the information in the QoS monitoring configuration enables the monitoring and detection of QoS non-fulfillment to be tuned towards different services such that optimized per service reliability can be achieved.

According to a third aspect of the disclosure, embodiments provide a method for a client device, the method comprises:
  obtaining a QoS monitoring configuration associated with an application;
  monitoring for a QoS non-fulfillment in one or more radio links serving the application based on the QoS monitoring configuration; and
  providing a QoS non-fulfillment indication to the application upon detection of a QoS non-fulfillment of one or more QoS requirements obtained from the QoS monitoring configuration.

The method according to the third aspect can be extended into implementation forms corresponding to the implementation forms of the client device according to the first aspect. Hence, an implementation of the method comprises the feature(s) of the corresponding implementation of the client device.

The advantages of the methods according to the third aspect are the same as those for the corresponding implementation forms of the client device according to the first aspect.

According to a fourth aspect of the disclosure, embodiments provide a method for a network node, the method comprises:
  obtaining a QoS monitoring activation request associated with an application from a client device;
  determining at least one part of a QoS monitoring configuration based on the QoS monitoring activation request;
  transmitting the QoS monitoring configuration to the client device.

The method according to the fourth aspect can be extended into implementation forms corresponding to the implementation forms of the network node according to the second aspect. Hence, an implementation of the method comprises the feature(s) of the corresponding implementation of the network node.

The advantages of the methods according to the fourth aspect are the same as those for the corresponding implementation forms of the network node according to the second aspect.

The disclosure also relates to a computer program, characterized in program code, which when run by at least one processor causes said at least one processor to execute any method according to embodiments of the disclosure. Further, the disclosure also relates to a computer program product comprising a computer readable medium and said mentioned computer program, wherein said computer program is included in the computer readable medium, and comprises one or more from the group: read-only memory (ROM), programmable ROM (PROM, erasable PROM (EPROM), flash memory, electrically EPROM (EEPROM) and hard disk drive.

Further applications and advantages of the embodiments of the disclosure will be introduced from the following detailed description.

BRIEF DESCRIPTION OF THE DRAWINGS

The appended drawings are intended to clarify and explain different embodiments of the disclosure, in which.

DETAILED DESCRIPTION

The feature notification control has been introduced to allow the core network (CN) to be notified by the radio access network (RAN) when a negotiated QoS cannot be met. Notification control is applicable for guaranteed bit rate flows. The core network requests the radio access network to notify the core network, during a packet data unit (PDU) session life span, when a negotiated QoS cannot be met. This feature is intended for applications which can adjust to changes in QoS, e.g., video streaming where the video codec bit rate may be adjusted dynamically. For example, when an application in the data network is notified that a negotiated QoS cannot be met it can adjust its codec rate and the radio access network may then, if needed, reconfigure the data radio bearer to the client device to better suit the new bit rate.

In the lower layers, the client device monitors the radio link connection. Radio link failure (RLF) is declared in the client device after a certain preconfigured number of detected out-of-synchronizations (3GPP TS 38.133, section 8.1). An out-of-synchronization is defined as a certain number of radio link measurements over a time period, typically 50-500 ms, where the signal-to-interference and noise ratio (SINR) is too low to achieve sufficient downlink control channel decoding performance. At RLF, upper layers in the client device report "No-Service" to applications, while lower layers try to restore the radio link or search for a new radio link.

Notification control is based in the core network with assistance from the radio access network. Interaction with the application in the client device would go via the core network to the corresponding application in the data network and then to the application in the client device. This is a slow mechanism and it further requires a working link to the client device, if the application in the data network would like to communicate with the application in client device upon a reported notification control. Hence, for URLLC use cases, this notification is too slow.

The RLF procedure is performed in the client device but it is also a slow mechanism. The purpose is to declare the radio link as lost and not to detect QoS problems early. The RLF procedure is suitable for enhanced mobile broadband (eMBB) type of applications but for sensitive URLLC applications the RLF procedure is too slow, typically in the order of 100 ms instead of single ms. Hence, the RLF procedure does not allow the application to take any precautionary actions. Setting the parameters for RLF to enable the client device to declare RLF at an earlier time may lead to unnecessary amount of radio link recovery procedures and increase the time spent with no service.

Hence, the inventors realize that there is a need for a method for declaring problems with the connection serving an application with fast response time compared to current conventional methods.

Figure 1:
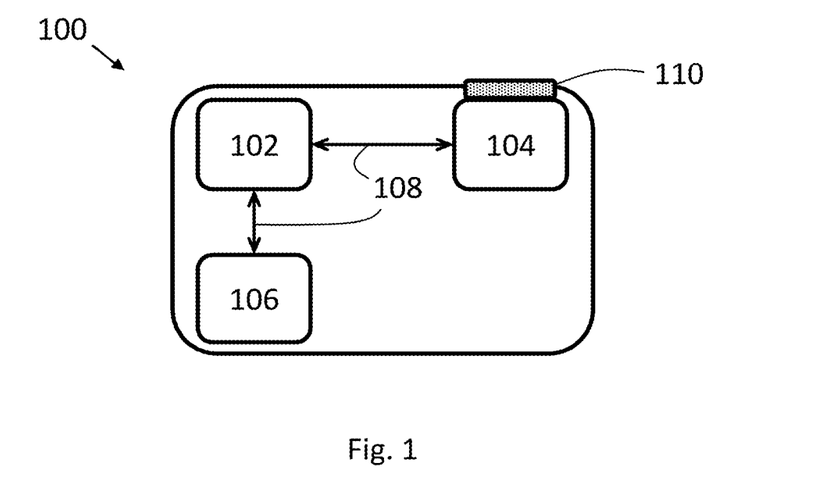
FIG. 1 shows a client device according to an embodiment of the disclosure.

FIG. 1 shows a client device 100 according to an embodiment of the disclosure. In the embodiment shown in FIG. 1, the client device 100 comprises a processor 102, a transceiver 104 and a memory 106. The processor 102 is coupled to the transceiver 104 and the memory 106 by communication means 108 known in the art. The client device 100 further comprises an antenna or antenna array 110 coupled to the transceiver 104, which means that the client device 100 is configured for wireless communications in a wireless communication system.

That the client device 100 is configured to perform certain actions can in this disclosure be understood to mean that the client device 100 comprises suitable means, such as, e.g., the processor 102 and the transceiver 104, configured to perform said actions.

According to embodiments of the disclosure, the client device 100 is configured to obtain a QoS monitoring configuration associated with an application and monitor for a QoS non-fulfillment in one or more radio links serving the application based on the QoS monitoring configuration. The client device 100 is further configured to provide a QoS non-fulfillment indication 120 to the application upon detection of a QoS non-fulfillment of one or more QoS requirements obtained from the QoS monitoring configuration.

Figure 2:
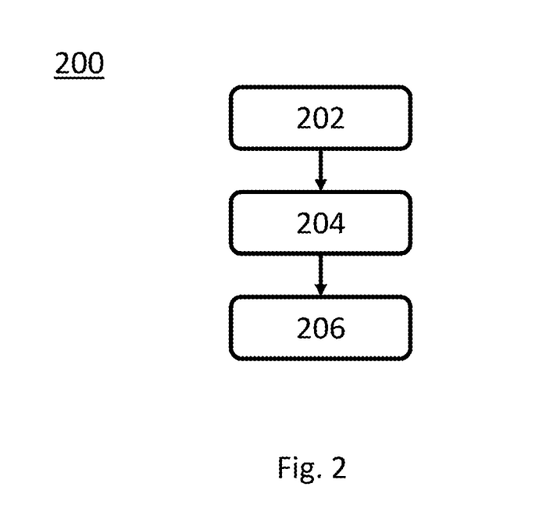
FIG. 2 shows a method for a client device according to an embodiment of the disclosure.

FIG. 2 shows a flow chart of a corresponding method 200 which may be executed in a client device 100, such as the one shown in FIG. 1. The method 200 comprises obtaining 202 a QoS monitoring configuration associated with an application and monitoring 204 for a QoS non-fulfillment in one or more radio links serving the application based on the QoS monitoring configuration. The method 200 further comprises providing 206 a QoS non-fulfillment indication 120 to the application upon detection of a QoS non-fulfillment of one or more QoS requirements obtained from the QoS monitoring configuration.

Figure 3:
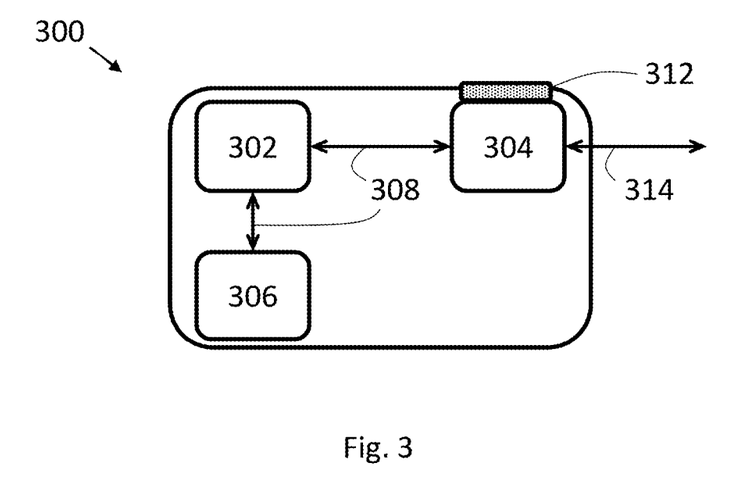
FIG. 3 shows a network node according to an embodiment of the disclosure.

FIG. 3 shows a network node 300 according to an embodiment of the disclosure. In the embodiment shown in FIG. 3, the network node 300 comprises a processor 302, a transceiver 304 and a memory 306. The processor 302 is coupled to the transceiver 304 and the memory 306 by communication means 308 known in the art. The network node 300 may be configured for both wireless and wired communications in wireless and wired communication systems, respectively. The wireless communication capability is provided with an antenna or antenna array 312 coupled to the transceiver 304, while the wired communication capability is provided with a wired communication interface 314 coupled to the transceiver 304.

That the network node 300 is configured to perform certain actions can in this disclosure be understood to mean that the network node 300 comprises suitable means, such as, e.g., the processor 302 and the transceiver 304, configured to perform said actions.

According to embodiments of the disclosure, the network node 300 is configured to obtain a QoS monitoring activation request 502 associated with an application from a client device 100. The network node 300 is further configured to determine at least one part of a QoS monitoring configuration based on the QoS monitoring activation request 502 and transmit the QoS monitoring configuration 504 to the client device 100.

Figure 4:
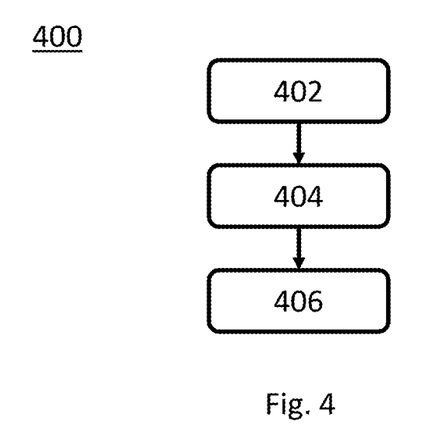
FIG. 4 shows a method for a network node according to an embodiment of the disclosure.

FIG. 4 shows a flow chart of a corresponding method 400 which may be executed in a network node 300, such as the one shown in FIG. 3. The method 400 comprises obtaining 402 a QoS monitoring activation request 502 associated with an application from a client device 100. The method 400 further comprises determining 404 at least one part of a QoS monitoring configuration based on the QoS monitoring activation request 502 and transmitting 406 the QoS monitoring configuration 504 to the client device 100.

Figure 5:
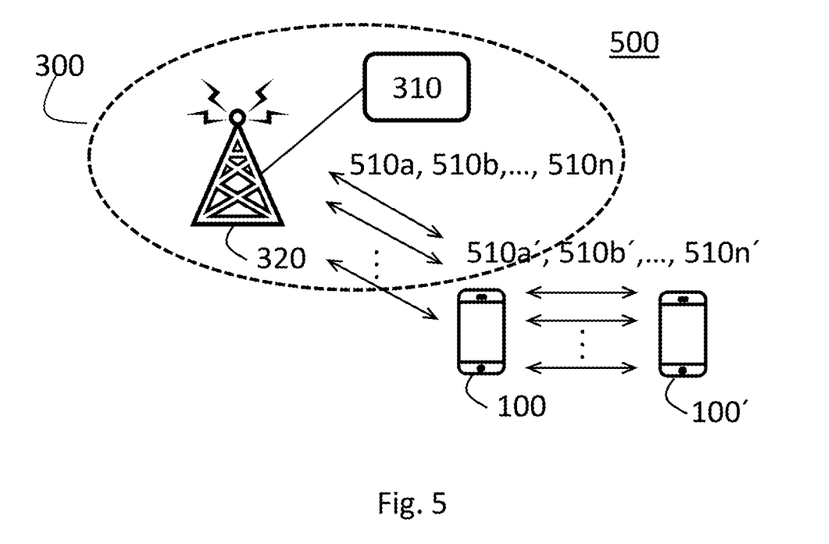
FIG. 5 shows a wireless communication system according to an embodiment of the disclosure.

FIG. 5 shows a wireless communication system 500 according to an embodiment of the disclosure. The wireless communication system 500 comprises a client device 100, in this embodiment denoted a first client device 100, a second client device 100', and a network node 300 configured to operate in the wireless communication system 500. In the embodiment shown in FIG. 5, the network node 300 can be a network node 310 in the core network and/or a network access node 320 in the radio access network. In the wireless communication system 500, one or more downlink and/or uplink radio links 510a, 510b, . . . , 510n are established between the network access node 320 and the first client device 100 to serve an application in the first client device 100. The application in the first client device 100 may be communicating with a corresponding application in a data network (not shown in FIG. 5) connected to the network node 300. The radio links 510a, 510b, . . . , 510n are established to fulfil a certain QoS requested by the application. Alternatively or in addition, one or more radio links 510a', 510b', . . . , 510n' may be established between the first client device 100 and the second client device 100' to serve the application in the first client device 100. The one or more radio links 510a', 510b', . . . , 510n' may, e.g., be NR sidelinks (SL), sometimes referred to as PC5 interfaces.

According to embodiments of the disclosure, a solution for providing a QoS non-fulfillment indication to the application in the client device 100 is introduced. The QoS non-fulfillment indication is a low latency indication that can give the application an early warning about QoS problems on the radio links 510a, 510b, . . . , 510n, 510a', 510b', . . . , 510n' used by the application. The low latency of the QoS non-fulfillment indication makes it suitable for future applications types targeted for 5G, e.g., applications where failure to meet QoS can have dire consequences to the client device 100 hosting the application or other client devices in its proximity. The QoS non-fulfillment indication can be used to trigger, autonomously in the client device 100, a pre-programed behaviour in the application. Examples of such pre-programmed behaviour in the application is to take precautionary actions and/or enter into a "safe-mode". Practical examples of such "safe-mode" in the vehicle-to-anything (V2X) area could be to decrease the speed and increase the distance between vehicles. For factory automation an actor, such as a robot, may simply halt its current activity. A drone may hover or return to a predefined location.

Consequently, the introduction of the QoS non-fulfillment indication according to the disclosure may play a vital role as a safety mechanism for future 5G applications, as a tool to prevent potential dire issues that could be caused by an instantaneous QoS degradation.

The disclosure introduces a solution for activation and configuration of the QoS non-fulfillment indication and monitoring and filtering of QoS indications from multiple violation detection sources, as well as methods in respective layer for routing of QoS indications and the QoS non-fulfillment indication. The disclosure further introduces reporting of the QoS non-fulfillment indication to the network and give examples of actions taken by the application in the case of a QoS non-fulfillment indication.

Figure 6:
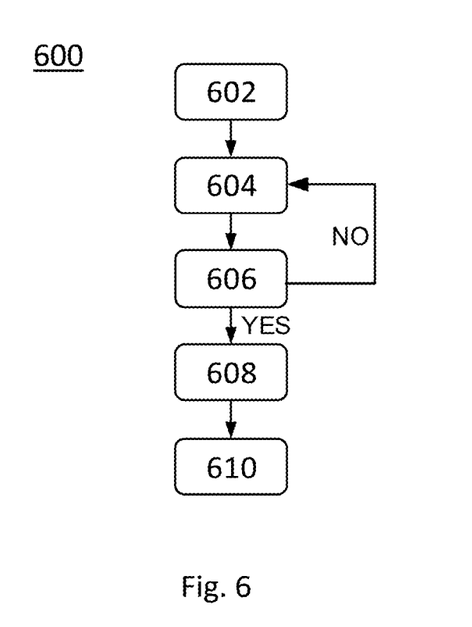
FIG. 6 shows a method for monitoring for QoS non-fulfillment according to an embodiment of the disclosure.

FIG. 6 shows a flow chart of a method 600 for monitoring for QoS non-fulfillment according to embodiments of the disclosure. In step 602, the client device 100 obtains the QoS monitoring configuration associated with the application. The QoS monitoring configuration indicates at least one of: a QoS monitoring rule, information of downlink radio links serving the application, a downlink timer associated with the downlink radio links, information of uplink radio links serving the application, an uplink timer associated with the uplink radio links, and a QoS threshold value. Information of downlink and/or uplink radio links serving the application may indicate the number of radio links in downlink and/or uplink, and an identifier/tag or rule of identification of each radio link. The QoS monitoring configuration provides the client device 100 with information to configure the monitoring for QoS non-fulfillments for the radio links serving the application and to provide QoS non-fulfillment indications upon detection of a QoS non-fulfillment of one or more QoS requirements.

The client device 100 may obtain the QoS monitoring configuration in different ways. The client device 100 may in embodiments obtain the QoS monitoring configuration based on information received from the network node 300 and/or based on a predefined rule. Thus, the client device 100 may receive at least one part of the QoS monitoring configuration from the network node 300. Furthermore, the client device 100 may derive at least one part of the QoS monitoring configuration from a predefined rule. Any combination of these two options is possible. Hence, the client device 100 may in embodiments receive the full QoS monitoring configuration from the network node 300, derive the full QoS monitoring configuration from the predefined rule, or receive one part of the QoS monitoring configuration from the network node 300 and derive another part of the QoS monitoring configuration from the predefined rule. Any part of the QoS monitoring configuration received from the network node 300 may be received based on a request from the client device 100, as described below with reference to FIG. 7. Furthermore, when the client device 100 derives at least one part of the QoS monitoring configuration from a predefined rule, the client device 100 may use the predefined rule together with QoS information associated with the application. In embodiments, the client device 100 may hence derive at least one part of the QoS monitoring configuration from a predefined rule and in dependence on one or more characteristics of QoS flows or IP packet flows associated with the application, wherein the one or more characteristics are at least one of 5G QoS identifier, QoS flow identifier, resource type, packet error rate, packet delay budget, survival time, and jitter. The resource type indicates whether a QoS flow is of the type guaranteed bit rate (GBR), delay-critical GBR, or non-GBR flow. The definition of packet error rate and packet delay budget are different for GBR and delay-critical GBR resource types. Furthermore, the survival time can be the time period that an application consuming a communication service may continue without an anticipated message.

Based on the QoS monitoring configuration obtained in step 602, the client device 100 monitors for a QoS non-fulfillment in one or more radio links serving the application in step 604. That the monitoring in step 604 is based on the QoS monitoring configuration can, e.g., mean that the client device 100 monitors radio links identified from the QoS monitoring configuration against one or more QoS requirements obtained from the QoS monitoring configuration. The QoS requirement may be any of error rate or latency. The error rate may be a block error rate (BLER) or a packet error rate (PER). The error rate may further be expressed as an actual error rate obtained after an actual transmission of data packets or a hypothetical error rate estimated based on measured reference signals, i.e. without an actual transmission of data packets. The latency may be expressed as a timer value derived from the packet delay budget, where the packet delay budget defines an upper bound for the time that a packet may be delayed between the client device and the user plane function that terminates the N6 interface. The latency may, e.g., represent a portion of the packet delay budget.

In step 606, the client device 100 checks whether a QoS non-fulfillment of one or more QoS requirements obtained from the QoS monitoring configuration has been detected. Upon detection of a QoS non-fulfillment of one or more QoS requirements in step 606, the client device 100 provides/sends a QoS non-fulfillment indication 120 to the application in step 608. If no QoS non-fulfillment is detected in step 606, the client device 100 continues to monitor for a QoS non-fulfillment in the one or more radio links serving the application in step 604.

The detection of a QoS non-fulfillment in step 606 may comprise at least one of detect a QoS non-fulfillment in the downlink if at least one downlink radio link serving the application is indicated as not fulfilling a QoS requirement; and detect a QoS non-fulfillment in the uplink if at least one uplink radio link serving the application is indicated as not fulfilling a QoS requirement. At least one radio link, downlink or uplink, can herein be understood to mean a subset of all the radio links serving the application, where the subset can comprise one or more, up to all, of the radio links serving the application. In embodiments, the detection of a QoS non-fulfillment in step 606 may further consider a time period associated with the QoS non-fulfillment. In this case, detection of a QoS non-fulfillment comprises detect a QoS non-fulfillment in the downlink if at least one downlink radio link serving the application is indicated as not fulfilling a QoS requirement during a time period defined by the downlink timer; and detect a QoS non-fulfillment in the uplink if at least one uplink radio link serving the application is indicated as not fulfilling a QoS requirement during a time period defined by the uplink timer. The downlink timer and/or the uplink timer may be a timer or time window obtained from the QoS monitoring configuration.

In embodiments where the radio links serving the application are independent radio links configured for packet duplication in the downlink and the uplink, respectively, the detection of a QoS non-fulfillment comprises at least one of detect a QoS non-fulfillment in the downlink if all independent downlink radio links serving the application are indicated as not fulfilling a QoS requirement; and detect a QoS non-fulfillment in the uplink if all independent uplink radio links serving the application are indicated as not fulfilling a QoS requirement. Also in this case the detection of a QoS non-fulfillment may further consider a time period such that detection of a QoS non-fulfillment comprises at least one of detecting a QoS non-fulfillment in the downlink if all independent downlink radio links serving the application are indicated as not fulfilling a QoS requirement during a time period defined by the downlink timer; and detecting a QoS non-fulfillment in the uplink if all uplink radio links serving the application are indicated as not fulfilling a QoS requirement during a time period defined by the uplink timer.

When the QoS non-fulfillment indication 120 provided to the application in step 608 has reached the application in the client device 100, the application may perform certain predefined actions in step 610. For example, the application may control the client device 100 based on the QoS non-fulfillment indication 120. The application may execute a pre-programmed behaviour which could be one or more precautionary actions. Example of such precautionary actions for V2X could be to decrease the speed of a vehicle, notify a driver to be prepared for increased manual control or to increase the distance between vehicles in case of platooning. For industrial cases, such as discrete automation, a device may simply halt its current activity. For airborne devices, a drone may hover or return to a predefined location.

In order to inform the application when the QoS is again fulfilled for the radio links serving the application, the client device 100 may further monitor for QoS fulfillment. The client device 100 may in embodiments monitor for a QoS fulfillment in the one or more radio links based on the QoS monitoring configuration. In such embodiments, the client device 100 provides a QoS fulfillment indication 130 to the application upon detection of a QoS fulfillment of the one or more QoS requirements. In a similar way as for the detection of QoS non-fulfillment, the detection of QoS fulfillment may be based on at least one downlink and/or uplink radio link serving the application being indicated as fulfilling a QoS requirement, e.g., during a time period defined by the downlink and/or uplink timer. The QoS requirement used to detect QoS fulfillment may be the same or different from the QoS requirement used to detect QoS non-fulfillment.

In other embodiments a timer may be used to restore the QoS status of the radio links serving the application after a QoS non-fulfillment indication. At least one detection method is continuous in nature when configured and QoS non-fulfillment indications are continuously provided to the application when detected. Upon receiving a QoS non-fulfillment indication, the application starts a QoS monitoring timer. The QoS monitoring timer may be configured by the network during the establishment of the PDU session for the application. Every time a new QoS non-fulfillment indication is received, the application will restart the QoS monitoring timer if it is already running. If the QoS monitoring timer expires, the application will assume that the QoS is back to the requested/guaranteed level.

Figure 7:
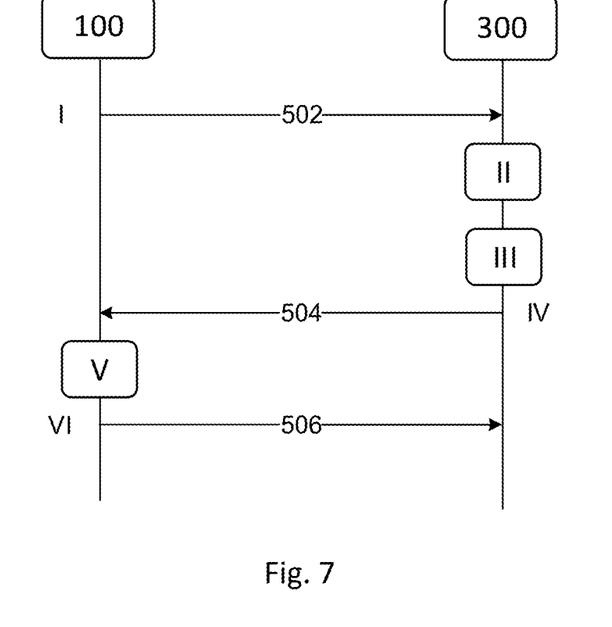
FIG. 7 shows signaling between a client device and a network node for activation and configuration of monitoring for QoS non-fulfillment according to an embodiment of the disclosure

According to embodiments of the disclosure, the monitoring for QoS non-fulfillment may be activated and configured by the network node 300 based on a QoS monitoring activation request 502 from the client device 100 and/or based on subscription data or QoS flow characteristics. FIG. 7 shows signaling between the client device 100 and the network node 300 for activation and configuration of monitoring for QoS non-fulfillment according to such embodiments. In step I in FIG. 7, the client device 100 transmits a QoS monitoring activation request 502 to the network node 300. Step I is an optional step performed in embodiments where the activation is based on an explicit request from the client device 100. The QoS monitoring activation request 502 is associated with an application and may request the activation of monitoring for QoS non-fulfillment for a network slice, a PDU session, or a QoS flow. The QoS monitoring activation request 502 may be transmitted in any of a REGISTRATION REQUEST message, a PDU SESSION ESTABLISHMENT REQUEST message, and a PDU SESSION MODIFICATION REQUEST message. The QoS monitoring activation request 502 may be comprised in an existing or new information element (IE) in any of these messages. For example, the QoS monitoring activation request 502 may be comprised in a new IE in the REGISTRATION REQUEST message, and in the SGSM capability IE in the PDU SESSION ESTABLISHMENT REQUEST message. If the QoS monitoring activation request 502 is included in an IE on the top level of these respective messages, QoS monitoring can be requested per network slice with the use of slice service type (SST) and slice differentiator (SD), or requested per PDU Session. If the client device 100 wants to enable monitoring for QoS non-fulfillment for a specific QoS flow, then the QoS monitoring activation request 502 can be comprised in the QoS flow descriptions IE in the PDU SESSION MODIFICATION REQUEST message. In this way it is possible to differentiate within a PDU session and configure monitoring for QoS non-fulfillment specifically per QoS Flow ID (QFI).

In step II in FIG. 7, the network node 300 determines whether to activate monitoring for QoS non-fulfillment or not. The determination in step II in FIG. 7 may be based on the QoS monitoring activation request 502 associated with the application from the client device 100. Hence, the network node 300 may in step II in FIG. 7 determine to activate monitoring for QoS non-fulfillment upon receiving the QoS monitoring activation request 502 from the client device 100. The determination in step II in FIG. 7 may further be based on QoS flow characteristics or subscription data, i.e. without an explicit activation request from the client device 100. Hence, the network node 300 may in embodiments determine whether to activate monitoring for QoS non-fulfillment or not without receiving the QoS monitoring activation request 502. When the determination in step II in FIG. 7 is based on QoS flow characteristics, the 5QI/QFI table may be extended with information indicating whether monitoring for QoS non-fulfillment should be activated for a QFI or not. The monitoring for QoS non-fulfillment information could be added as an attribute or as a note to certain QFIs. Hence, the monitoring for QoS non-fulfillment may be implicitly activated based on the QFI of the data traffic for the application. When the determination in step II in FIG. 7 is based on user subscription data, the monitoring for QoS non-fulfillment activation information could be added as an attribute or as a flag in the subscription data in the unified data management (UDM).

The activation of monitoring for QoS non-fulfillment based on user subscription data enables the monitoring for QoS non-fulfillment to be activated per network slice, PDU session, or QoS flow. When the client device 100 requests establishment of a PDU session towards a network slice, the network node 300 can check the subscription data with the UDM. If monitoring for QoS non-fulfillment is allowed for the user according to the subscription data, the network node 300 can inform the client device 100 that monitoring for QoS non-fulfillment can be enabled in the PDU SESSION ESTABLISHMENT ACCEPT message (not shown in FIG. 7). During the PDU session establishment procedure, the network node 300 can further activate monitoring for QoS non-fulfillment only for those QoS flows for which it is allowed based on subscription data. Whether monitoring for QoS non-fulfillment can be activated or not for each of the QoS flows can then be included in the QoS flow description IE. If the network node 300 does not enable monitoring for QoS non-fulfillment for a QoS flow during the PDU SESSION ESTABLISHMENT procedure, the client device 100 may request the network node 300 to enable it via PDU SESSION MODIFICATION procedure, as previously described.

In step III in FIG. 7, the network node 300 determines at least one part of a QoS monitoring configuration. The network node 300 may determine the at least one part of the QoS monitoring configuration based on the QoS monitoring activation request 502. The network node 300 may determine the QoS monitoring configuration based on the QoS monitoring activation request 502 and in dependence on one or more characteristics of QoS flows or IP packet flows associated with the application, wherein the one or more characteristics are at least one of 5G QoS identifier, QoS flow identifier, resource type, packet error rate, packet delay budget, survival time and jitter. In embodiments where the client device 100 does not transmit the QoS monitoring activation request 502, the network node 300 may determine the QoS monitoring configuration based on one or more characteristics of the QoS flows or IP packet flows. The network node 300 may further considered additional input such as capabilities of the client device 100 and capability and capacity of the network access node serving the client device 100. The QoS monitoring configuration may indicate at least one of: a QoS monitoring rule, information of downlink radio links serving the application, a downlink timer associated with the downlink radio links, information of uplink radio links serving the application, an uplink timer associated with the uplink radio links, and a QoS threshold value.

When the network node 300 has determined the QoS monitoring configuration 504, the network node 300 transmits the QoS monitoring configuration 504 to the client device 100 in step IV in FIG. 7. In the embodiment shown in FIG. 7, the client device 100 receives the QoS monitoring configuration 504 from the network node 300 in response to transmission of the QoS monitoring activation request 502 to the network node 300. Based on the received QoS monitoring configuration 504, the client device 100 monitors for a QoS non-fulfillment in one or more radio links serving the application in step V in FIG. 7. As previously described, the client device 100 may further derive at least one part of the QoS monitoring configuration based on a predefined rule. The monitoring in step V in FIG. 7 may be performed according to the method 600 described above.

According to embodiments of the disclosure, the client device 100 provides a report 506 to the network node 300, where the report 506 indicates information about the QoS non-fulfillment, as shown in step VI in FIG. 7. The network node 300 can in this case be the corresponding application in the data network, a node in the core network, or a network access node. The client device 100 may provide the report 506 to the network node 300 in a SDAP report or in an application layer report. When the SDAP report is used, the report information can be conveyed as a new control PDU or new header information piggybacked with a data PDU. The application in the client device 100 may control the providing of the application layer report to the network node 300. The application may use all potential available wireless links for transmission of the report 506, to increase reliability. Furthermore, non-access stratum (NAS) can be used to provide the report 506. In this case, the report 506 may be transmitted using, e.g., a new signalling message over a N1 interface or a NAS control message over a non-3GPP link.

Figure 8:
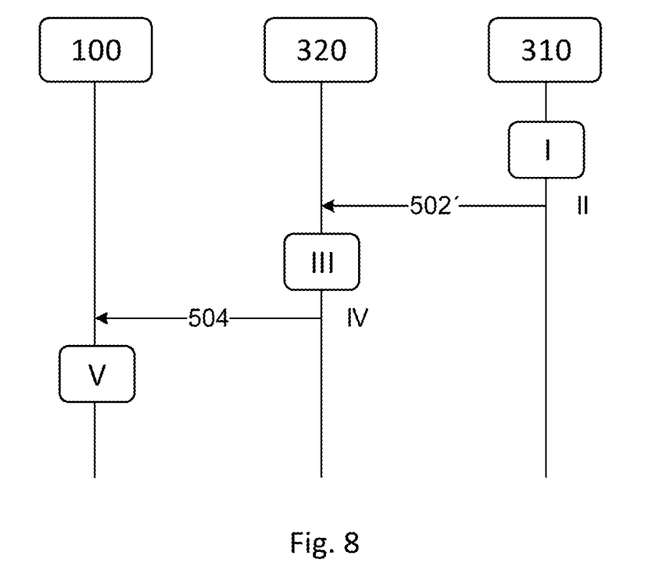
FIG. 8 shows signaling between a client device, a core network node, and a network access node for activation and configuration of monitoring for QoS non-fulfillment according to an embodiment of the disclosure.

In embodiments, the network node 300 may be a network node 310 and a network access node 320 and the functions of the network node 300 may be split between the network node 310 and the network access node 320. FIG. 8 shows signaling between the client device 100, the network node 310, and the network access node 320 for activation and configuration of monitoring for QoS non-fulfillment according to such embodiments. In the embodiment shown in FIG. 8, the determination whether to activate monitoring for QoS non-fulfillment is performed in the network node 310 in step I, e.g. by a session management function (SMF) in the network node 310. As previously described, the determination may be based on the QoS monitoring activation request 502 from the client device 100 and/or based on subscription data or QoS flow characteristics. If the network node 310 determines to activate monitoring for QoS non-fulfillment, the network node 310 provides a QoS monitoring activation request 502' to the network access node 320, as shown in step II in FIG. 8. For example, configuration for activation of monitoring for QoS non-fulfillment may be added to the signalling between the network node 310 and the network access node 320, such that, e.g., the access management function (AMF) in the network node 310 can request setup of monitoring for QoS non-fulfilment from the network access node 320, either for a PDU session or for specific QFI within a PDU Session.

Based on the QoS monitoring activation request 502', the network access node 320 determines at least a part of the QoS monitoring configuration 504 in step III in FIG. 8. For example, based on the characteristics of the QoS flow where monitoring for QoS non-fulfilment have been requested the network access node 320 will derive the specific settings of parameters for the different detection mechanism to be used in the client device 100. The network access node 320 further transmits the determined QoS monitoring configuration 504 to the client device 100, as shown in step IV in FIG. 8. The QoS monitoring configuration 504 may, e.g., be comprised in a RRC configuration message. In this case, the RRC configuration messages for the Uu interface is extended with parameters for monitoring for QoS non-fulfilment.

In step V in FIG. 8, the client device 100 monitors for a QoS non-fulfillment in one or more radio links serving the application based on the received QoS monitoring configuration 504 and/or the QoS monitoring configuration derived based on the predefined rule.

According to embodiments, the client device 100 obtains the QoS monitoring configuration in a first layer, monitors for a QoS non-fulfillment in the one or more radio links in a third layer and provides QoS indications from the third layer to a second layer. In such embodiments, the client device 100 detects a QoS non-fulfillment of the one or more QoS requirements in the second layer based on QoS indications provided by the third layer. The first layer may be radio resource control (RRC) or non access stratum (NAS), the second layer may be packet data convergence protocol (PDCP) or medium access control (MAC), and the third layer may be medium access control (MAC) or physical layer (PHY).

Figure 9:
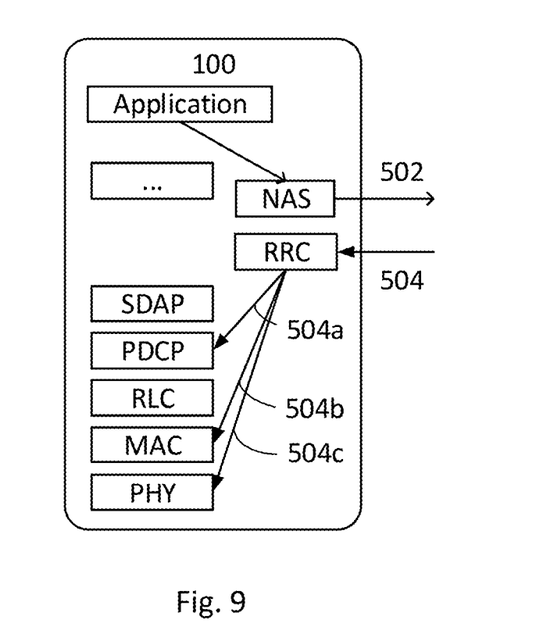
FIG. 9 shows configuration of monitoring for QoS non-fulfillment in the client device according to an embodiment of the disclosure.

FIG. 9 shows configuration of monitoring for QoS non-fulfillment in the client device 100 according to an embodiment of the disclosure. In FIG. 9, the RRC layer obtains the QoS monitoring configuration 504, e.g., from the network node 300 and configures the lower layers to monitor and detect QoS non-fulfillment. The RRC layer may obtain the QoS monitoring configuration 504 in response to an QoS monitoring activation request 502 originating from the application in the client device 100 and transmitted to the network node 300 via the NAS layer. In the embodiment shown in FIG. 9, it is assumed that detection of QoS non-fulfillment should be performed in the PDCP layer and monitoring for QoS non-fulfillment should be performed in both the MAC layer and the PHY layer. Thus, the RRC layer provides QoS monitoring configuration 504a to configure the PDCP layer to perform detection of QoS non-fulfillment. The RRC layer further provides QoS monitoring configurations 504b, 504c to the MAC layer and the PHY layer, respectively, to configure the MAC layer and the PHY layer to perform monitoring for QoS non-fulfillment.

Figure 10:
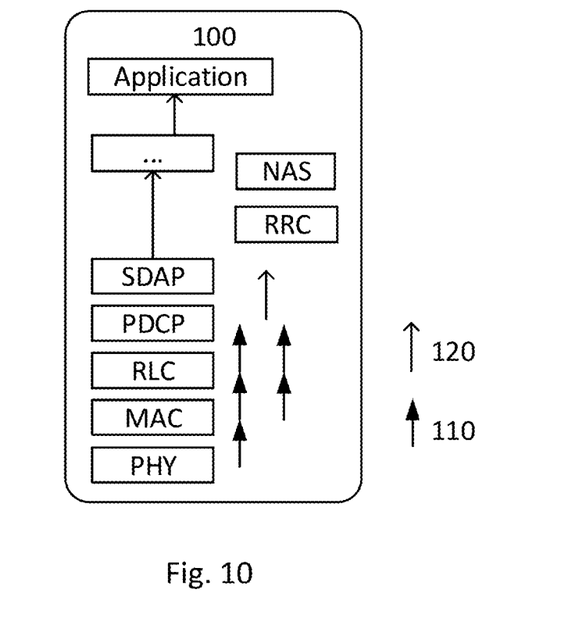
FIG. 10 shows indication of QoS non-fulfillment in the client device according to an embodiment of the disclosure.

FIG. 10 shows indication of QoS non-fulfillment in the client device 100 according to embodiments of the disclosure. In the embodiment shown in FIG. 10, monitoring for QoS non-fulfillment is performed both in the PHY layer and the MAC layer. Furthermore, detection of QoS non-fulfillment is performed in the PDCP layer. Thus, the client device 100 monitors for a QoS non-fulfillment in the PHY layer and the MAC layer and provide QoS indications 110 from the PHY layer and the MAC layer to the PDCP layer. As shown in FIG. 10, the QoS indications 110 are passed via one or more higher layer to the PDCP layer. A QoS non-fulfillment of the one or more QoS requirements in the PDCP layer is detected based on the QoS indications 110 provided by the PHY layer and/or MAC layer and a QoS non-fulfillment indication 120 is generated. The QoS non-fulfillment indication 120 is provided by the PDCP layer to the application via one or more higher layers.

According to embodiments of the disclosure, the client device 100 provides the QoS non-fulfillment indication to the application via at least one of service data adaptation protocol (SDAP) layer, a radio link control (RLC) layer, and an intermediate layer, wherein the intermediate layer is arranged above the SDAP layer but below the application layer. In embodiments where the client device 100 provides the QoS non-fulfillment indication to the application via the SDAP layer, the client device 100 may perform reverse access stratum mapping in the SDAP layer so as to identify one or more QoS flows associated with the application upon detection of non-fulfillment of the one or more QoS requirements. The reverse access stratum mapping in the SDAP layer is hence triggered by the detection of a non-fulfillment of the one or more QoS requirements and is performed to map each affected radio link to a QoS flow. For example, the SDAP layer gets an indication from the PDCP layer indicating which data radio bearers (DRBs) are impacted by the non-fulfillment of the one or more QoS requirements. Access stratum mapping is the mapping received from the radio access network to map the QoS flows to DRBs in the uplink. Hence, the SDAP layer may apply reverse access stratum mapping to, from the DRBs, identify which QoS flows are impacted by the non-fulfillment of the one or more QoS requirements. The SDAP layer may then indicate the identified QoS flows to the intermediate layer, where the intermediate layer is one or more layers between SDAP and the application.

In embodiments where the client device 100 provides the QoS non-fulfillment indication to the application via the intermediate layer, the client device 100 may apply a packet filter in reverse in the intermediate layer so as to identify the application upon detection of non-fulfillment of the one or more QoS requirements. The application of the packet filter in reverse in the intermediate layer is hence triggered by the detection of a non-fulfillment of the one or more QoS requirements and is applied to identify the application from one or more QoS flows impacted by the non-fulfillment of the one or more QoS requirements. For example, the intermediate layer may receive an indication from the SDAP layer, as described above, which identifies QoS flows impacted by the non-fulfillment of the one or more QoS requirements. The reverse action can be understood to mean that the intermediate layer goes through the QoS rules and find the QoS rule applicable to the impacted QoS flows, extracts the relevant packet filter information, e.g., source port, source address etc., and send this information to higher layers, e.g., the IP stack in the application.

In embodiments where dual connectivity and/or carrier aggregation is used, with or without packet duplication, the disclosure provides different ways of filtering the QoS indications from the third layer in the second layer. The radio bearer configuration from the network shall include for each logical channel, for which monitoring for QoS non-fulfillment is configured, the number of independent radio links and a timer. The independent radio links may further be specific for downlink and uplink. Further details related to different detection and filtering embodiments will now be described with reference to FIGS. 11-12.

Figure 11:
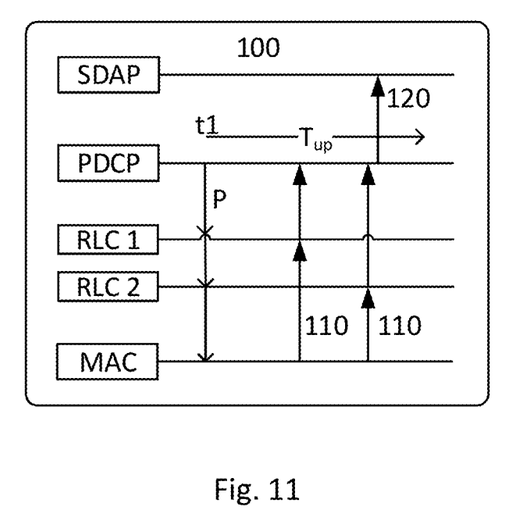
FIG. 11 shows detection of QoS non-fulfillment in the client device according to an embodiment of the disclosure.

FIG. 11 shows an embodiment where detection of QoS non-fulfillment for uplink radio links is performed in the PDCP layer based on filtering of QoS indications 110 from the MAC layer. In FIG. 11, two independent radio links are available for uplink transmission and are monitored for QoS non-fulfillment in the MAC layer. The two independent radio links are associated with a first RLC entity RLC 1 and a second RLC entity RLC2, respectively, in the RLC layer. Filtering of the QoS indications 110 from the MAC layer, via the RLC layer, is performed in the PDCP layer based on a counter per PDCP packet and an uplink timer $T_{up}$. The uplink timer $T_{up}$ is started when a packet is received in the PDCP layer from higher layers and passed to the MAC layer, via the RLC layer. In the embodiment shown in FIG. 11, a packet is received and the uplink timer $T_{up}$ is hence started at time instance t1. For each QoS indication 110 received from the MAC layer in the PDCP layer the counter is incremented. If a predefined number of QoS indications for the packet are received within the uplink timer $T_{up}$, the PDCP layer detects a QoS non-fulfillment and provides a QoS non-fulfillment indication 120 to the application. The predefined number of QoS indications may, e.g., be larger than or equal to the number of independent radio links. If the predefined number of QoS indications are not received within the uplink timer $T_{up}$, any received QoS indication 110 is discarded. In the embodiment shown in FIG. 11, it is assumed that the predefined number of QoS indications is set to two. In FIG. 11, two QoS indications 110 are received before the uplink timer $T_{up}$ expires, one from each independent radio link, therefore a QoS non-fulfillment indication 120 is triggered. In FIG. 11, the QoS indication 120 is provided to the application via the SDAP layer.

Figure 12:
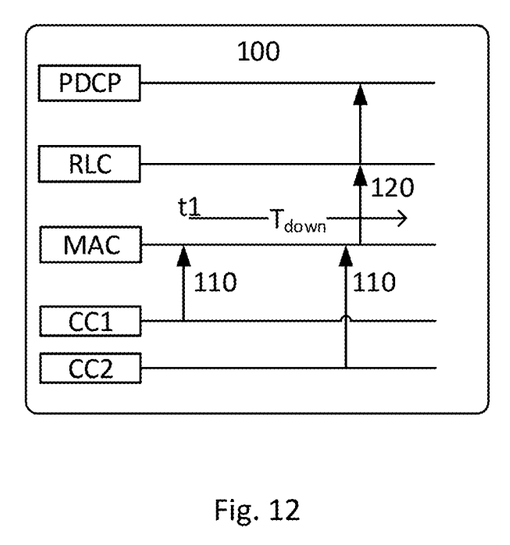
FIG. 12 shows detection of QoS non-fulfillment in the client device according to an embodiment of the disclosure.

FIG. 12 shows an embodiment where detection of QoS non-fulfillment for downlink radio links is performed in the MAC layer based on filtering of QoS indications 110 from the PHY layer. In FIG. 12, two independent radio links, i.e. two separate component carriers (CCs), CC1, CC2 are available for downlink transmission and are monitored for QoS non-fulfillment in the PHY layer. The two independent radio links CC1, CC2 are connected to one QoS flow in higher layers. In a similar way as for the uplink detection described with reference to FIG. 11, the QoS indications 110 are filtered based on a counter and a timer. Hence, filtering of the QoS indications 110 from the PHY layer is performed in the MAC layer based on a counter per QoS indication and a downlink timer $T_{down}$. The downlink timer $T_{down}$ is started upon reception of a QoS indication 110, which in FIG. 12 is at time instance t1. If QoS indications 110 are not received from all independent radio links during the downlink timer $T_{down}$ any received QoS indication 110 is discarded. In FIG. 12, a QoS indication 110 is received from the second component carrier CC2 before the downlink timer $T_{down}$ expires, therefore a QoS non-fulfillment indication 120 is triggered. In FIG. 12, the QoS indication 120 is provided to the application via the RLC layer and the PDCP layer. Note that when carrier aggregation is configured the network node 300 may in embodiments configure monitoring for QoS non-fulfillment for only one of the carriers.

The client device 100 herein, may be denoted as a user device, User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network node 310 may comprise as least one of a session management function (SMF), an access and mobility management function (AMF), a policy control function (PCF), a unified data management (UDM), or a user plane function (UPF).

The network access node 320 may be denoted as a radio network access node, an access network access node, an access point, or a base station, e.g., a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as, e.g., macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a read-only memory (ROM), a programmable ROM (PROM), an erasable PROM (EPROM), a flash memory, an electrically EPROM (EEPROM), or a hard disk drive.

Moreover, embodiments of the client device 100 and the network node 300 comprises the necessary communication capabilities in the form of, e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the client device 100 and the network node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

What is claimed is:

1. A client device for a wireless communication system, the client device comprising at least one processor, the client device being configured to:
    obtain a quality-of-service (QOS) monitoring configuration associated with an application;
    monitor for a QoS non-fulfillment in one or more radio links serving the application based on the QoS monitoring configuration; and
    upon detection of a QoS non-fulfillment of one or more QoS requirements obtained from the QoS monitoring configuration, provide a QoS non-fulfillment indication to the application via at least one of: a service data adaptation protocol layer, a radio link control layer, or an intermediate layer, wherein the intermediate layer is arranged above the service data adaptation protocol layer and below an application layer.

2. The client device according to claim 1, configured to:
    monitor for a QoS fulfillment in the one or more radio links based on the QoS monitoring configuration; and
    provide a QoS fulfillment indication to the application upon detection of a QoS fulfillment of the one or more QoS requirements.

3. The client device according to claim 1, wherein the QoS monitoring configuration indicates at least one of: a QoS monitoring rule, information of downlink radio links serving the application, a downlink timer associated with the downlink radio links, information of uplink radio links serving the application, an uplink timer associated with the uplink radio links, or a QoS threshold value.

4. The client device according to claim 3, wherein the detection of the QoS non-fulfillment comprises at least one of:
    detect the QoS non-fulfillment in the downlink based on at least one downlink radio link serving the application being indicated as not fulfilling a QoS requirement; or detect the QoS non-fulfillment in the uplink based on at least one uplink radio link serving the application being indicated as not fulfilling the QoS requirement.

5. The client device according to claim 4, wherein the detection of the QoS non-fulfillment further comprises:
  detect the QoS non-fulfillment in the downlink based on at least one downlink radio link serving the application being indicated as not fulfilling a QoS requirement during a time period defined by the downlink timer; and
  detect the QoS non-fulfillment in the uplink based on at least one uplink radio link serving the application being indicated as not fulfilling a QoS requirement during a time period defined by the uplink timer.

6. The client device according to claim 4, wherein the QoS requirement is at least one of: error rate or latency.

7. The client device according to claim 3, wherein the radio links serving the application are independent radio links configured for packet duplication in the downlink and the uplink, respectively, and wherein the detection of the QoS non-fulfillment comprises at least one of:
  detect the QoS non-fulfillment in the downlink based on all independent downlink radio links serving the application being indicated as not fulfilling a QoS requirement; or
  detect the QoS non-fulfillment in the uplink based on all independent uplink radio links serving the application being indicated as not fulfilling a QoS requirement.

8. The client device according to claim 7, wherein the detection of the QoS non-fulfillment comprises at least one of:
  detect the QoS non-fulfillment in the downlink based on all independent downlink radio links serving the application being indicated as not fulfilling a QoS requirement during a time period defined by the downlink timer; or
  detect the QoS non-fulfillment in the uplink based on all independent uplink radio links serving the application being indicated as not fulfilling a QoS requirement during a time period defined by the uplink timer.

9. The client device according to claim 1, configured to:
  obtain the QoS monitoring configuration in a first layer;
  monitor for the QoS non-fulfillment in the one or more radio links in a third layer and provide QoS indications from the third layer to a second layer; and
  detect the QoS non-fulfillment of the one or more QoS requirements in the second layer based on the QoS indications provided by the third layer.

10. The client device according to claim 9, wherein
  the first layer is radio resource control or non access stratum,
  the second layer is packet data convergence protocol or medium access control, and
  the third layer is medium access control or physical layer.

11. The client device according to claim 1, wherein the obtaining the QoS monitoring configuration comprises:
  receiving at least one part of the QoS monitoring configuration from a network node.

12. The client device according to claim 11, configured to:
  receive the QoS monitoring configuration from the network node in response to a transmission of a QoS monitoring activation request to the network node.

13. The client device according to claim 12, wherein the QoS monitoring activation request is transmitted in at least one of: a registration request message, a pdu session establishment request message, or a pdu session modification request message.

14. The client device according to claim 1, wherein the obtaining the QoS monitoring configuration comprises:
  deriving at least one part of the QoS monitoring configuration from a predefined rule.

15. The client device according to claim 14, wherein the obtaining the QoS monitoring configuration comprises:
  deriving at least one part of the QoS monitoring configuration from a predefined rule and in dependence on one or more characteristics of QoS flows or IP packet flows associated with the application, wherein the one or more characteristics are at least one of: 5G QoS identifier, QoS flow identifier, resource type, packet error rate, packet delay budget, or survival time and jitter.

16. The client device according to claim 1, configured to:
  perform reverse access stratum mapping in the service data adaptation protocol layer so as to identify one or more QoS flows associated with the application upon detection of the QoS non-fulfillment of the one or more QoS requirements.

17. The client device according to claim 1, configured to:
  apply a packet filter in reverse in the intermediate layer so as to identify the application upon detection of the QoS non-fulfillment of the one or more QoS requirements.

18. The client device according to claim 1, configured to:
  provide a report to a network node, wherein the report indicates information about the QoS non-fulfillment.

19. The client device according to claim 18, configured to:
  provide the report to a network node in a service data adaptation protocol report or in an application layer report.

20. A network node for a wireless communication system, comprising at least one processor, the network node being configured to:
  obtain a quality-of-service (QOS) monitoring activation request associated with an application from a client device according to claim 1;
  determine at least one part of the QoS monitoring configuration based on the QoS monitoring activation request; and
  transmit the QoS monitoring configuration to the client device.

21. The network node according to claim 20, wherein the determining the QoS monitoring configuration comprises:
  determining the QoS monitoring configuration based on the QoS monitoring activation request and in dependence on one or more characteristics of QoS flows or IP packet flows associated with the application, wherein the one or more characteristics are at least one of: 5G QoS identifier, QoS flow identifier, resource type, packet error rate, packet delay budget, or survival time and jitter.

22. The network node according to claim 20, wherein the QoS monitoring configuration indicates at least one of: a QoS monitoring rule, information of downlink radio links serving the application, a downlink timer associated with the downlink radio links, information of uplink radio links serving the application, an uplink timer associated with the uplink radio links, or a QoS threshold value.

23. A method for a client device, the method comprising:
  obtaining a quality-of-service (QOS) monitoring configuration associated with an application;
  monitoring for a QoS non-fulfillment in one or more radio links serving the application based on the QoS monitoring configuration; and
  upon detection of a QoS non-fulfillment of one or more QoS requirements obtained from the QoS monitoring configuration, providing a QoS non-fulfillment indication to the application via at least one of:

a service data adaptation protocol layer, a radio link control layer, or an intermediate layer, wherein the intermediate layer is arranged above the service data adaptation protocol layer and below an application layer.

24. A non-transitory computer-readable medium, having computer-executable instructions stored thereon, the computer-executable instructions, when executed by one or more processors, cause a processor to perform a method according to claim 23.

\* \* \* \* \*